(12) United States Patent
Takatsuji et al.

(10) Patent No.: US 7,949,762 B2
(45) Date of Patent: May 24, 2011

(54) ADDRESS MANAGING METHOD AND COMMUNICATION APPARATUS

(75) Inventors: Ayako Takatsuji, Osaka (JP); Junji Yoshida, Osaka (JP); Masazumi Yamada, Osaka (JP); Takahiro Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 12/097,106

(22) PCT Filed: Dec. 5, 2006

(86) PCT No.: PCT/JP2006/324205
§ 371 (c)(1),
(2), (4) Date: Jun. 12, 2008

(87) PCT Pub. No.: WO2007/074611
PCT Pub. Date: Jul. 5, 2007

(65) Prior Publication Data
US 2009/0157885 A1  Jun. 18, 2009

(30) Foreign Application Priority Data

Dec. 26, 2005  (JP) ................................. 2005-373295

(51) Int. Cl.
*G06F 15/16* (2006.01)
(52) U.S. Cl. .......................... 709/227; 709/224; 709/245
(58) Field of Classification Search .................. 709/223, 709/245, 228, 224, 227
See application file for complete search history.

(56) References Cited

U.S. PATENT DOCUMENTS

| 2005/0223411 A1* | 10/2005 | Jung et al. ...................... 725/135 |
| 2006/0089735 A1* | 4/2006 | Atkinson ......................... 700/94 |
| 2006/0209884 A1* | 9/2006 | MacMullan et al. .......... 370/465 |
| 2006/0209892 A1* | 9/2006 | MacMullan et al. .......... 370/468 |
| 2007/0165997 A1* | 7/2007 | Suzuki et al. .................... 386/46 |

FOREIGN PATENT DOCUMENTS

| JP | 2001-268095 | 9/2001 |
| JP | 2001-326656 | 11/2001 |

OTHER PUBLICATIONS

International Search Report issued Jan. 16, 2007 in the International (PCT) Application of which the present application is the U.S. National Stage.

(Continued)

*Primary Examiner* — Oanh Duong
(74) *Attorney, Agent, or Firm* — Wenderoth, Lind & Ponack, L.L.P.

(57) ABSTRACT

A communication apparatus establishes a one-way data connection and a connection to a network in which messages are transferred in two ways, and includes: a one-way data connection status detecting unit which detects a connection validating request indicating a communication apparatus on a data reception side that data transmission, utilizing the one-way data connection, is possible and a connection invalidating request indicating that the data transmission is impossible, both of which are outputted from the communication apparatus on the data reception side; an apparatus address obtaining unit which obtains an apparatus address with a message via the network when a change from the connection invalidating request to the connection validating request is detected; an address holding unit which holds the apparatus address; and a message transmission continuing unit which responds to the message received via the network based on the apparatus address held by the address holding unit regardless of whether or not the connection invalidating request is detected.

5 Claims, 7 Drawing Sheets

OTHER PUBLICATIONS

HDMI Licensing LLC (Hitachi et al.), High—Definition Multimedia Interface Specification Version 1.2, sections 8.1-8.8, pp. 87/110 to 100/110, Aug. 22, 2005.

HDMI Licensing LLC (Hitachi et al.), High—Definition Multimedia Interface Specification Version 1.2, sections CEC 10.1-10.2.1, pp. CEC-16 of 84 to CEC-18 of 84, Aug. 22, 2005.

* cited by examiner

FIG. 2

| Logical address value | Logical address value (4 bits, binary) | Appliance category |
|---|---|---|
| 0 | 0b0000 | TV |
| 1 | 0b0001 | Recording Device 1 |
| 2 | 0b0010 | Recording Device 2 |
| 3 | 0b0011 | STB1 |
| 4 | 0b0100 | DVD1 |
| 5 | 0b0101 | Audio System |
| 6 | 0b0110 | STB2 |
| 7 | 0b0111 | STB3 |
| 8 | 0b1000 | DVD2 |
| 9 | 0b1001 | Recording Device 3 |
| 10-13 | 0b1001-0b1101 | Reserved |
| 14 | 0b1110 | Free Use |
| 15 | 0b1111 | Unregistered (as initiator address) Broadcast (as destination address) |

ADDRESS MANAGING METHOD AND COMMUNICATION APPARATUS

BACKGROUND OF THE INVENTION

1. Technical Field

The present invention relates to address managing methods and communication apparatuses, and particularly to an address managing method of a communication address for a communication apparatus in a network, such as a home entertainment network, to which the communication apparatus establishes a one-way data connection and in which messages are transferred in two ways between communication apparatuses.

2. Background Art

Recently, home networks are being established for providing various contents having high image quality and high sound quality with users to enjoy by mutually connecting in-home digital appliances. For example, the HDMI (High-Definition Multimedia Interface), designed in December, 2002, is a digital audio-video input-output interface standard, for next-generation AV appliances, allowing a single cable to transmit video, audio, and control signals (See Non-patent reference 1, for example). The HDMI standard is accepted as a digital output format for the AV appliances, such as a DVD player and an STB, to provide a digital output to a digital TV. In addition, the HDMI standard stipulates the CEC (Consumer Electronics Control) which is a protocol for allowing a control signal to be transmitted in two ways. Utilization of the CEC protocol enables a single remote to control plural AV appliances, relaying the control signal by the appliances. In other words, an entire home theater system can be operated with the single remote by transmitting the control signal in two ways between a TV, an AV amplifier, and a DVD player.

A method for an address assignment for mutual acknowledgement between intra-network appliances in the CEC protocol shall be described hereinafter. Regarding appliance acknowledgement and connection configuration acknowledgement in the CEC protocol, first, a physical address is mapped, utilizing a DDC (Display Data Channel) bus for establishing a one-way data connection. The physical address is an identification number using a 16-bit number divided into four by 4 bits, and expressed in a row of four decimal numbers from 0 to 15, such as "0.0.0.0". The DDC is a VESA (Video Electronics Standards Association) standard defined to be a function for transmitting display model information to a connection destination appliance in order to achieve plug and play on the display. The display model information is stored in RAM or rewritable nonvolatile memory as the EDID (Enhanced Extended Display Identification Data). When a read permission, that is a trigger validating the one-way data connection, is represented by a HPD (Hot Plug Detect Signal), the display model information is read out of the connection destination appliance via the DDC bus.

FIG. 1 is a diagram showing an example of a home network structure. A home network 1 includes a TV 10, an AV amplifier 20, and a DVD player 30. The home network 1 has a network structure connected in a tree-shaped star. A physical address is assigned to each of appliances, using the DDC bus.

The TV 10 includes one HDMI input port 10PI_1. The AV amplifier 20 includes one HDMI output port 20PO_1 and two HDMI input ports 20PI_1 and 20PI_2. The DVD player 30 includes one HDMI output port 30PO_1. The TV 10, the AV amplifier 20 and the DVD player 30 include associated EDID for respective HDMI input ports.

Here, the power of all the appliances is assumed to be on. Since having no HDMI output port, the TV 10 is deemed to be a root device, that is, an appliance having a physical address "0.0.0.0".

Following the physical address assignment rule of the HDMI, the TV 10 sets a physical address to "1.0.0.0" (10PA_1) in the EDID for the HDMI input port 10PI_1. Then, the TV 10 shows an EDID read permission with the HPD. Here, the physical address "1.0.0.0" (10PA_1) is for an appliance connected to the HDMI input port 10PI_1.

With the permission shown in the HPD by the TV 10, the AV amplifier 20, having the HDMI output port 20PO_1 connected to the HDMI input port 10PI_1 of the TV 10, reads the EDID of the TV 10 and recognizes the fact that a physical address "1.0.0.0" (20PA_0) has been assigned.

The AV amplifier 20 sets: a physical address, connected to the HDMI input port 20PI_1, to "1.1.0.0" (20PA_1) in the EDID for the port; and a physical address, connected to the HDMI input port 20PI_2, to "1.2.0.0" (20PA_2) in the EDID for the port. The AV amplifier 20 shows the EDID read permission in the HPD to the HDMI input port 20PI_1 to which the DVD player 30 is connected.

With the permission shown in the HPD by the AV amplifier 20, the DVD player 30, having the HDMI output port 30PO_1 connected to the HDMI input port 20PI_1 of the AV amplifier 20, reads the EDID of the AV amplifier 20 and recognizes the fact that a physical address "1.1.0.0" (30PA_0) has been assigned.

As mentioned above, the physical addresses, reflecting a topology path for the connection for one-way data connection, are assigned to the intra-network appliances, and then, logical addresses for two-way communication between each of the appliances are mapped, using a CEC bus for a two-way connection. A logical address is an ID defining a category of an appliance. FIG. 2 shows a definition of the logical addresses defined by the CEC protocol.

Upon the respective above mentioned physical addresses assigned, the TV 10, the AV amplifier 20, and the DVD player 30 start obtaining associated logical addresses to categories of the appliances. The logical addresses are obtained by transmitting a <Polling Message>, one of CEC messages transmitted with a CEC control signal.

FIG. 3 is a diagram showing a structure of a frame in a CEC message. Having a basic frame structure, block, the CEC message is structured with one or more blocks. Each of a one-bit EOM field and a one-bit ACK field always exists per block, and is similarly used in any given block. Meanwhile, an 8-bit information field in the block is used differently, depending on a content of a message; however, the first block in the message is structured to be the header block.

FIG. 4 is a diagram showing a structure of a frame of the header block in the CEC message. The CEC message for the <Polling Message> is structured only with the header block. The header block includes a 4-bit initiator field (Field_1), a 4-bit destination field (Field_2), a 1-bit EOM field (Field_3), and a 1-bit ACK field (Field_4). A definition of each of the fields shall be described.

In the initiator field (Field_1), a logical address for a message source appliance is configured by the message source appliance. In the case of the <Polling Message>, the logical address of the appliance itself is not determined; however, a logical address value which the <Polling Message> source appliance intends to obtain is assigned In the destination field (Field_2), a logical address for a message address appliance is configured by the message source appliance. Thus, in the case of the <Polling Message>, the logical address value which the <Polling Message> source appliance intends to obtain is set in order to poll whether or not an appropriate and responding appliance exists.

In the EOM field (Field_3), information whether or not an additional block to be transmitted succeeds is configured by the message source appliance. Another block follows in the case where the field represents 0. In the case where the field represents 1, no succeeding field follows. Thus, 1 is set in the case of the <Polling Message> since the message is structured only with the header block.

In the ACK field (Field_4), a response to the message is configured by the message address appliance. Here, the response includes whether or not the message address appliance matches with the address of the message and the message shall be denied. In the case where the value of the address is other than 15 (=Broadcast), 1 in the field represents that the message address appliance does not match with the address of the message, thus the message shall be denied, and 0 represents the fact that the message address appliance matches with the address of the message, thus the message shall be accepted. In the case where the value of the address is 15 (=Broadcast), 0 in the field represents that the message address appliance does not match with the address of the message, thus the message shall be denied, and 1 represents that the message address appliance matches with the address of the message, thus the message shall be accepted. In the case of the <Polling Message>, the logical address which the message source appliance intends to obtain is configured in the destination field. When the appliance in the network judges the logical address for the appliance for itself by reading the destination field, the appliance replies with matched and accepted (ACK=0). This enables the message source appliance to detect that an appliance, with the logical address, which the message source appliance intends to obtain already exists when ACK=0 returns. Here, each bit is relayed on a CEC control signal line connected between each of the appliances. The message source appliance sets the ACK bit to high (ACK=1) in an ACK bit. An inactive signal line, even in one of the appliances in the network from high (ACK=1) to low (ACK=0), sets to be matched and accepted (ACK=0).

FIG. 5 is a diagram showing one example of a state in which the CEC message is transmitted. In this state, the AV amplifier 20 transmits the <Polling Message> when obtaining "Audio System" (=5,0b0101) as a logical address. When the AV amplifier 20 transmits a 9-bit; namely, 0b010101011, all of the appliances, in the network, which receive the 9-bit message judge whether or not the CEC message is for themselves by reading the destination field. In the case where the appliance receives the CEC message before obtaining the logical address, the appliance responds with unmatched and denied (ACK=1). For example, in the case where the AV amplifier 20 tries to obtain the logical address before the DVD player 30 obtains the logical address, the DVD player 30 sets to a 1-bit ACK, that is, 0b1 representing a reply showing unmatched and denied. Further, when the appliance receives the CEC message after obtaining the logical address, in the case where the CEC message is not addressed to the appliance, the appliance responds with unmatched and denied (ACK=1). For example, in the case where the TV 10 receives the CEC message after obtaining the logical address, the logical address for the TV 10 is "TV" (=0,0b000), thus the response from the TV 10 is unmatched and denied. Thus, the TV 10 sets to the 1-bit ACK, that is, 0b1 representing the reply showing unmatched and denied.

The DVD player 30 also transmits the <Polling Message> for obtaining "DVD1" (=4,0b0100) as a logical address.

In the case where there are plural appliances associated with the same appliance category in the network, an appliance which has already obtained the same appliance category replies to another appliance which subsequently transmits the <Polling Message> with the matched and accepted (ACK=0) for the <Polling Message>. Here, the polling message requests for obtaining the same appliance category. The appliance receiving the matched and accepted (ACK=0) again; changes the logical address intended to be obtained for obtaining another logical address; and transmits the <Polling Message>. Since the main feature of the present does not involve the system, description of the details shall be omitted.

Thus, upon receiving both of the physical address and the logical address, a report notification showing an association of the physical address and the logical address is issued by each of the appliances, using the CEC bus for two-way connection. The report notification is realized, transmitting one of the CEC messages a <Report Physical Address>.

FIG. 6 is a diagram showing one example of a state in which the CEC message is transmitted, which shows a state that the AV amplifier 20 transmits the <Report Physical Address>.

A <Report Physical Address> message is a Broadcast message including the header block and four data blocks. Thus, the AV amplifier 20 transmits the header block in which "Audio System" (=5,0b0101) is configured in the initiator field and 15 (=Broadcast) is configured in the destination field. When the AV amplifier 20 transmits a 9-bit signal; namely, 0b010111110110, all of the appliances, in the network, which receive the 9-bit signal read the destination field, judge the signal to be the Broadcast message, and then, respond with the matched and accepted (ACK=1). Then, the AV amplifier 20 transmits the data blocks. The data blocks include the physical address of the AV amplifier 20 ("1.0.0.0"); however, the main feature of the present invention does not include the details of the message, thus the description shall be omitted. Since the physical address is included in the data blocks, an association between the logical address and the physical address in the initiator field is notified. Here, the TV 10 and the DVD player 30 set each block to the 1-bit ACK, that is, 0b1 representing a reply showing matched and accepted.

The DVD player 30 also sets, in the header block, to "DVD1" (=4,0b0100) in the initiator field and to 15 (=Broadcast) in the destination field, and transmits to the data blocks the <Report Physical Address> message including the physical address "1.1.0.0".

Thus, upon receiving both of the physical address and the logical address for the appliance itself and reporting an association of the physical address and the logical address of the appliance itself to all the appliances in the network, each of the appliances establishes two-way communication to the associated logical addresses, using the CEC bus for connecting for two-way transmission and sometimes specifying an appliance with the physical address.

Non Patent Reference 1: High-Definition Multimedia Interface Specification Version 1.2.

SUMMARY OF THE INVENTION

In a mapping state of a physical address and a logical address; however, Non Patent Reference 1 fails to define a message transmission using the CEC protocol during an unpermitted (invalid) period in which permission with the HPD transits to unpermitted (invalid). Here, the HPD is to be a trigger for validating a connection for one-way data connection.

The present invention is conceived in view of the above problems and has as an objective to provide an address managing method and a communications apparatus which facilitate continued message transmission with a two-way connection even though a one-way data connection is invalid or a notification that the one-way data connection is invalid is received.

In order to achieve the above objectives, a communication apparatus in the present invention establishes a one-way data connection utilized for one-way data transmission to another communication apparatus, and a connection to a network through which a message is transferred in two ways, and includes: a one-way data connection status detecting unit which detects a connection validating request showing that data transmission, utilizing the one-way data connection, to the other communication apparatus is possible, and a connection invalidating request showing that the data transmission, utilizing the one-way data connection, to the other communication apparatus is impossible, the connection validating request and the connection invalidating request being outputted from the other communication apparatus; an apparatus address obtaining unit which obtains an apparatus address with the message via the network when a change from the connection invalidating request to the connection validating request is detected; an address holding unit which holds the apparatus address; and a message transmission continuing unit which responds to the message received via the network, based on the apparatus address held by the address holding unit regardless of whether or not the one-way data connection status detecting unit detects the connection invalidating request.

This allows the communication apparatus in the present invention to facilitate continued message transmission with a two-way connection, using an address which the address holding unit holds, even though a one-way data connection is invalid or a notification that the one-way data connection is invalid is received since the address holding unit holds the address.

Further, the communication apparatus may further include: an apparatus address notification message transmitting unit which notifies another communication apparatus connected to the network of the apparatus address with a message; a comparing unit which compares the apparatus address obtained by the apparatus address obtaining unit and the apparatus address held by the address holding unit so as to judge whether or not the apparatus address obtained by the apparatus address obtaining unit and the apparatus address held by the address holding unit match each other; and an address notification message transmission skipping unit which controls the apparatus address notification message transmission unit to avoid notifying the apparatus address in the case where a result of the comparison shows matching.

This can simplify processing in another communication apparatus connected to the communication apparatus and the network by skipping a report notification showing an association of an address in the case where no change is observed in the address (in the case where a comparison result by the comparison unit shows matching). Further, when a complex two-way message is transmitted, the number of messages simultaneously transmitted from communications apparatuses can be reduced, so that a collision and conflict of the messages can be prevented.

Moreover, the address holding unit further holds the address of the other communication apparatus connected to the network, and the message transmission continuing unit transmits a message and responds to a message, using either the apparatus address or the address of the other communication apparatus, regardless of whether or not the connection invalidating request is detected.

This can control an entire network system regardless of a status that the one-way data connection is invalid since a message can be transmitted, using another communication apparatus address held in the address holding unit.

Note that the present invention can be realized not only as the communication apparatus mentioned above, but also as an address managing method of a communication address used between communication apparatuses which achieve a characteristic unit included in the communication apparatus as a step.

The present invention is conceived to provide an address managing method and a communications apparatus which facilitate successive message transmission with a two-way connection even though a connection for one-way data connection is invalid or a notification that the connection for one-way data connection is invalid is received.

BRIEF DESCRIPTION OF DRAWINGS

FIG. 2 is a table showing definitions of logical addresses defined by the CEC protocol.

NUMERICAL REFERENCES

Figure 1:
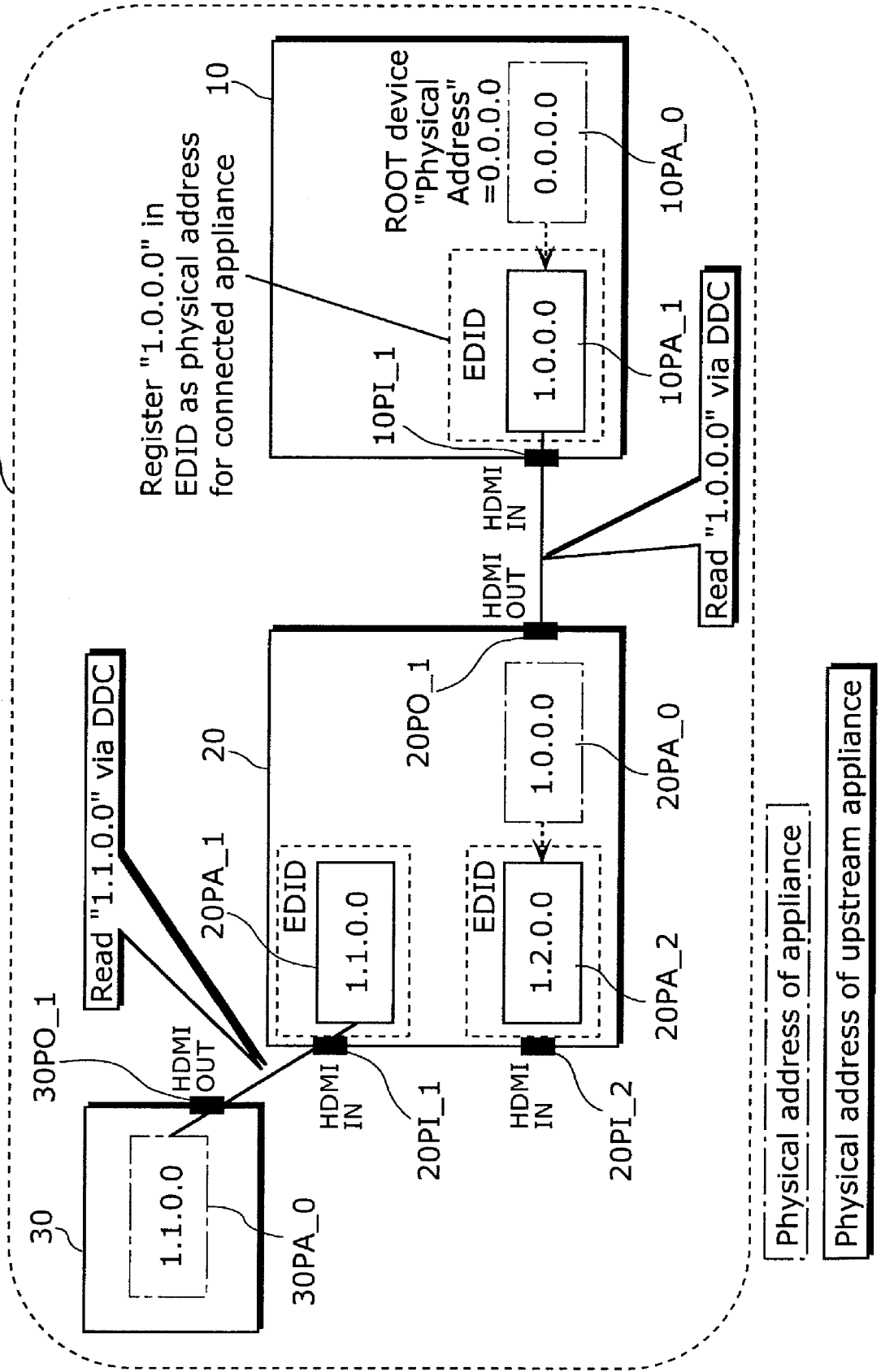
FIG. 1 is a diagram showing an example of a network structure.
Figure 3:
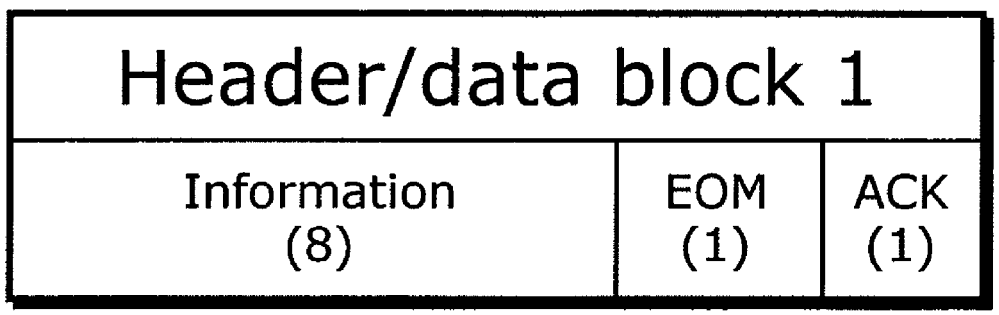
FIG. 3 is a diagram showing a structure of a frame in a CEC message.
Figure 4:
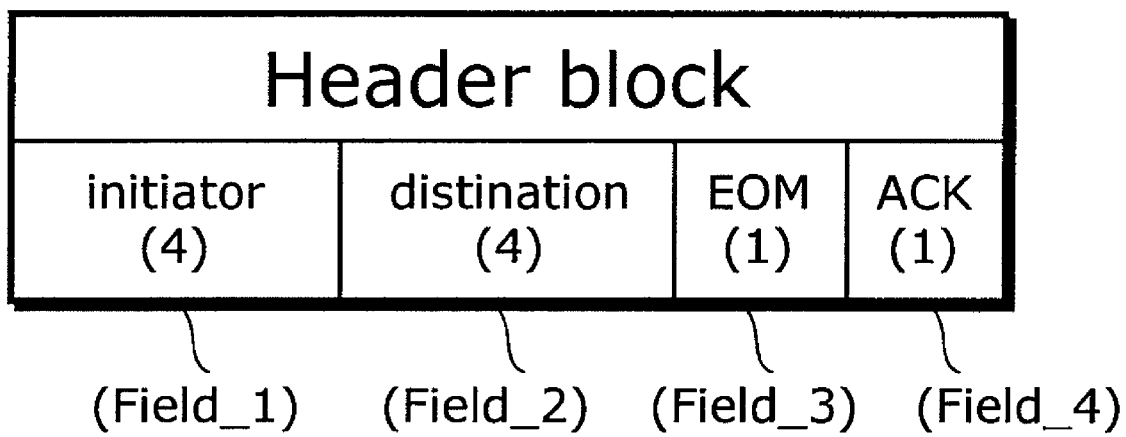
FIG. 4 is a block diagram of a frame of the header block in the CEC message.
Figure 5:
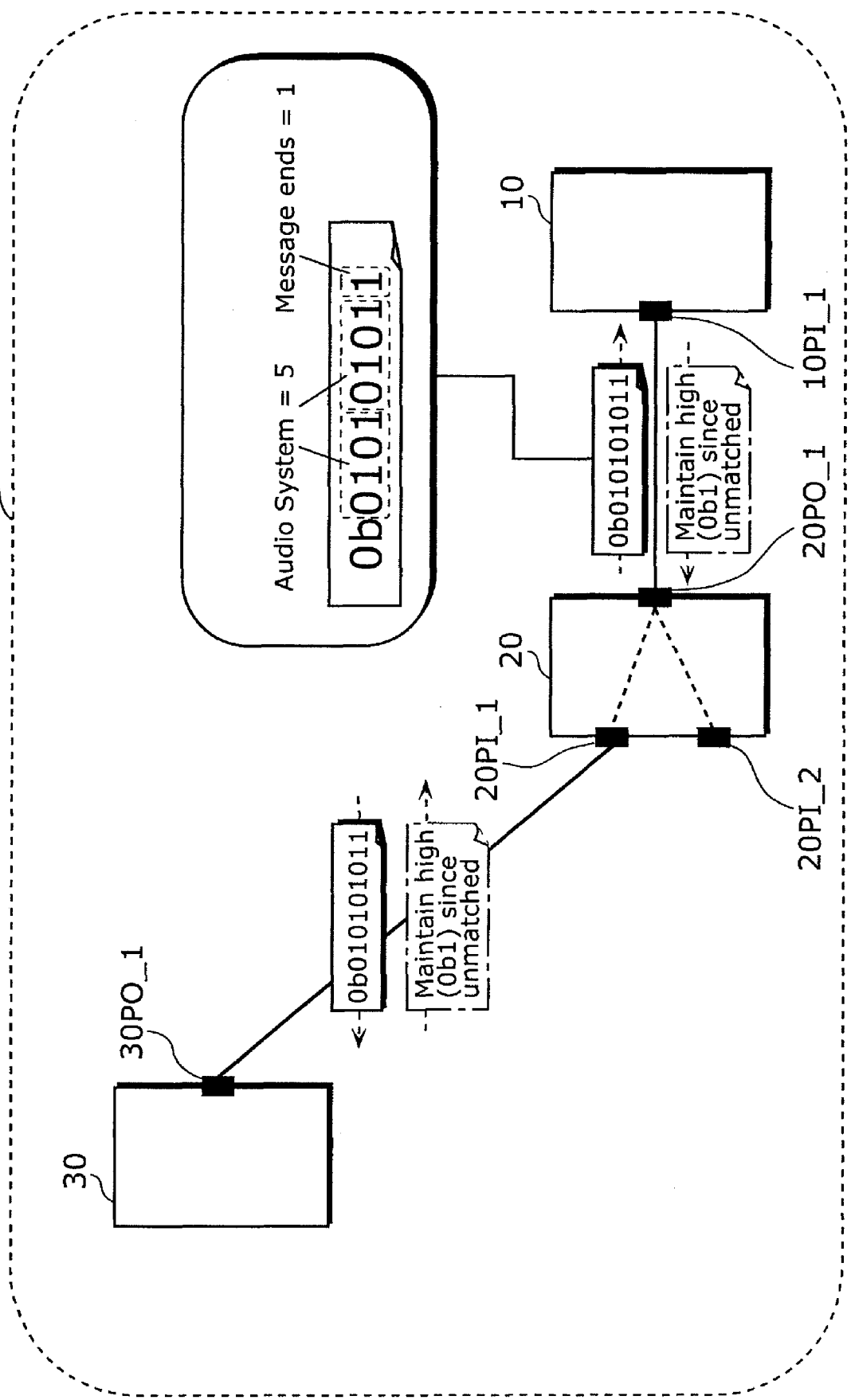
FIG. 5 is a diagram showing an example of a state that the CEC message is transmitted.
Figure 6:
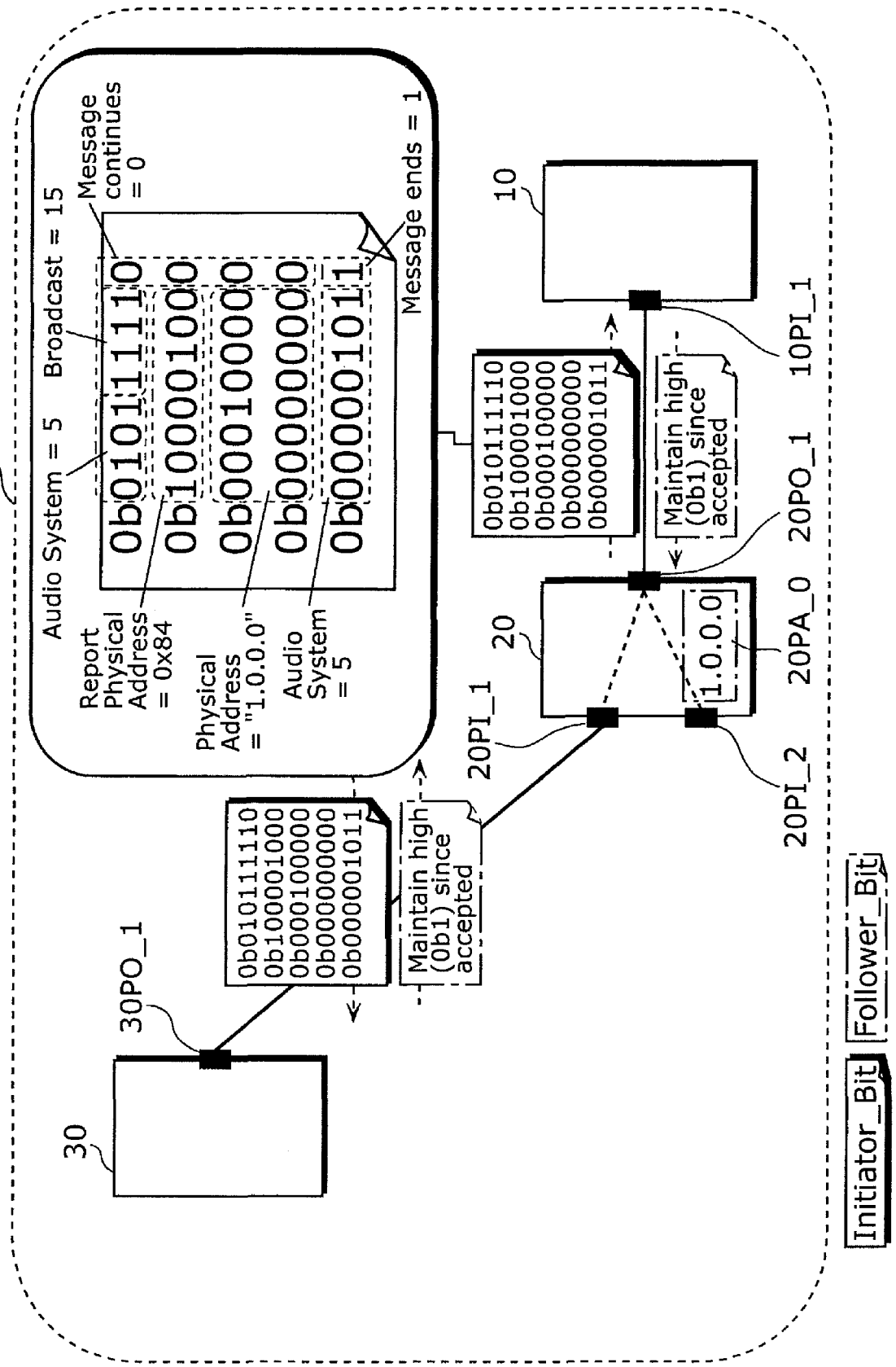
FIG. 6 is a diagram showing an example of a state that the CEC message is transmitted.

1 Home network
10 TV
20 AV amplifier
30 DVD player
100 Communications apparatus
101 One-way data connection status detecting unit
102 Apparatus address obtaining unit
103 Apparatus address notification message transmitting unit
104 Address holding unit
105 Message transmission continuing unit
106 Address notification message transmission skipping unit
110 Communication unit
10PA, 10PA_0, 10PA_1, 20PA, 20PA_0, 20PA_1, 20PA_2, 30PA, and 30PA_0 Physical address
10LA, 20LA, and 30LA Logical address
10PI_1, 20PI_1, and 20PI_2 HDMI input port
20PO_1, and 30PO_1 HDMI output port

DETAILED DESCRIPTION OF THE INVENTION

An embodiment of an address management method in the present invention shall be described with the drawings as follows.

The address management method in the embodiment of the present invention can facilitate continued message transmission through two-way communication with a continued use of a physical address and a logical address which are obtained when connection for one-way data connection is valid even though the connection for one-way data connection becomes invalid. Thus, maintaining a physical connection always allows an entire network system to be controlled and organized as a single component. Note that the physical connection may be a wired connection or a wireless connection.

Figure 7:
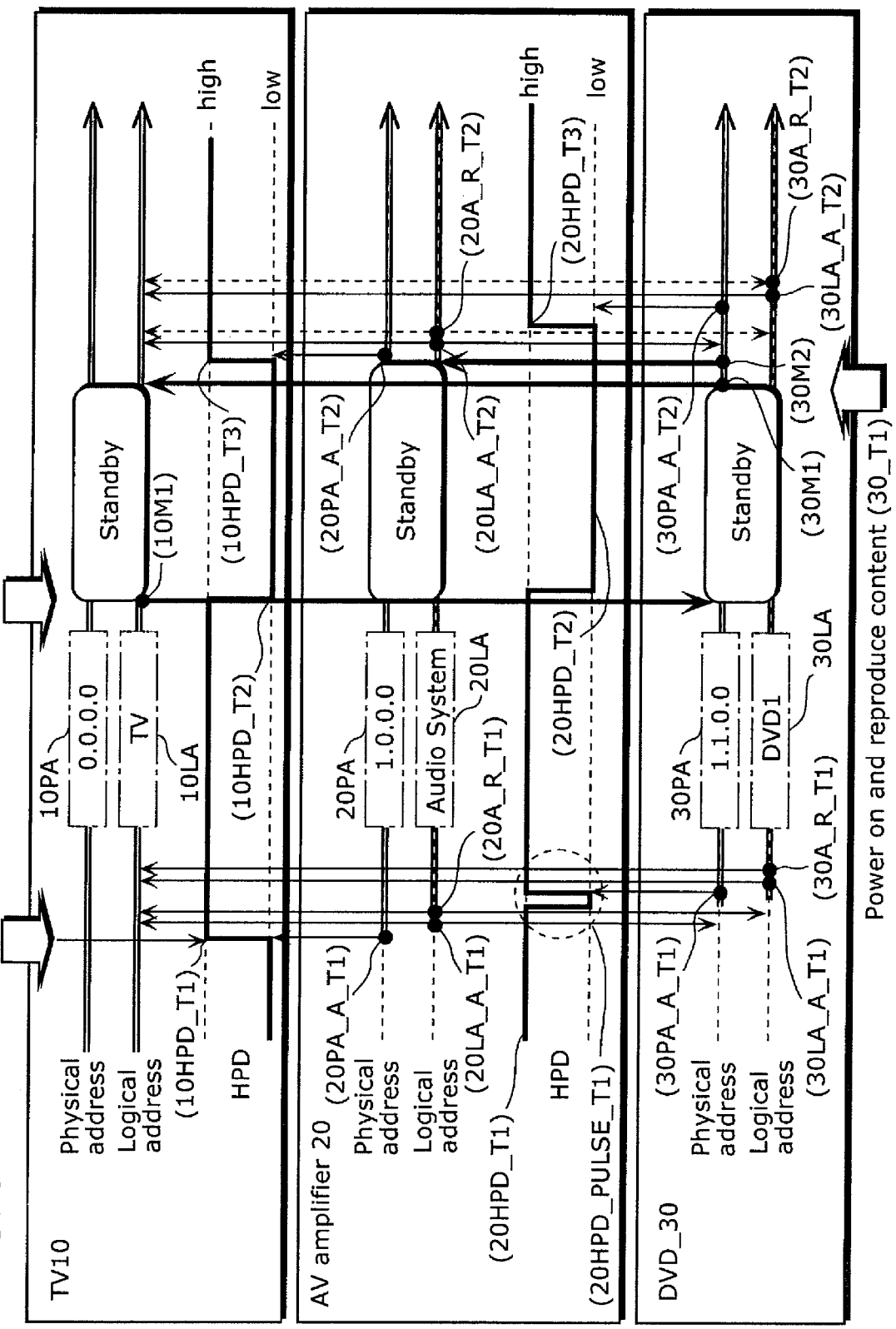
FIG. 7 is a diagram showing an example of an address managing state in the embodiment of the present invention.

FIG. 7 shows an example of an address management state in the embodiment of the present invention. In the embodiment of the present invention, a network structure is the same as that in FIG. 1 in that a one-way data connection is established between the TV 10, the AV amplifier 20, and the DVD player 30. Further, the AV amplifier 20 and the DVD player 30 are assumed to be in power-on while the TV 10 is assumed to be in power-off.

First, operations of the address management method in the embodiment of the present invention when the one-way data connection is invalid shall be described, using FIG. 7.

Since having no HDMI output port, the TV 10 is a root device and an apparatus having the physical address "0.0.0.0" (10PA) and a logical address "TV" (10LA). First, when the power of the TV 10 is turned on by a user (step 10P_T1), the TV 10 change the HPD into a valid state (turns the HPD signal from low to high) (step 10HPD_T1).

Upon the HPD of the TV 10 changing into the valid state, the AV amplifier 20 reads the EDID of the AV 10 for obtaining the physical address "1.0.0.0" (20PA) of the amplifier 20 (step 20PA_A_T1). Then, the AV amplifier 20 transmits the <Polling Message> for obtaining the logical address of the amplifier 20 "Audio System" (20LA) (step 20LA_A_T1). Upon obtaining the logical address "Audio System" (20LA), the AV amplifier 20 responds to the CEC message transmitted to the logical address.

The AV amplifier 20 transmits the <Report Physical Address> message for reporting an association between the logical address (20LA) and the physical address (20PA) of the AV amplifier 20 to the TV 10 and the DVD player 30.

The AV amplifier 20 pulses (→low→high) the HDP signal (20HPD_T1) (step 20 HPD_PULSE_T1). Here, the HPD signal has been maintained in high (valid state) since connected to the DVD player 30. A timing at which the AV amplifier 20 pulses the HPD signal is not limited here. For example, the timing may be before the step 20LA_A_T1 (before obtaining the logical address (20LA)). The pulse forming and the timing of the HPD signal are not main features of the present invention, and the detailed description shall be omitted.

When the HPD of the AV amplifier 20 returns to the valid state, the DVD player 30 reads the EDID of the AV amplifier 20 for obtaining the physical address of the DVD player 30 "1.1.0.0" (30PA) (step 30PA_A_T1). Then, the DVD player 30 transmits the <Polling Message> for obtaining the logical address of the DVD player 30 "DVD1" (30LA) (step 30LA_A_T1). Upon obtaining the logical address "DVD1" (30LA), the DVD player 30 responds to the CEC message transmitted to the logical address.

The DVD player 30 transmits the <Report Physical Address> message for reporting an association between the logical address (30LA) and the physical address (30PA) of the DVD player 30 to the TV 10 and the AV amplifier 20.

Here, the user is assumed to use the remote of the TV 10 for instructing power-off, for example (step 10P_T2). Now, the TV 10 allows the AV amplifier 20 and the DVD player 30 to simultaneously go into standby mode (power-off) by transmitting the CEC message <Standby> (step 10M1) as a control operation of the entire home theater system. When the AV amplifier 20 and the DVD player 30 go into standby mode, the AV amplifier 20 turns the HPD into an invalid state (turns the HPD signal from high to low) (step 20HPD_T2). The details of the CEC message <Standby> are not the main feature of the present invention, and thus the description shall be omitted.

The AV amplifier 20, a communications apparatus in the embodiment of the present invention, holds the logical address (20LA) and the physical address (20PA) of the AV amplifier 20 even though the HPD of the TV 10 turns to the invalid state (the HPD signal turns from high to low) (step 10HPD_T2). The DVD player 30, a communications apparatus of the present invention, also holds the logical address (30LA) and the physical address (30PA) of the DVD player 30 even though the HPD of the AV amplifier 20 turns to the invalid state. The DVD player 30 also holds the logical address (20LA) and the physical address (20PA) of the AV amplifier 20.

Here, the user is assumed to use the remote of the DVD player 30 for turning on the power of the DVD player 30 and starting content reproduction (step 30_T1). In this case, first, the CEC message <User Control Pressed> is transmitted from the DVD player 30 to the TV 10 in standby mode for turning the TV 10 into a power-on state, using the content reproduction operation on the DVD player 30 by the user as a trigger, for example. Next, the DVD player 30 transmits the CEC message <User Control Pressed> to the AV amplifier 20 in standby mode (step 30M2), and then, the AV amplifier 20 is turned into the power-on state. Here, the details of the CEC message <User Control Pressed> are not the main feature of the present invention, thus detailed description shall be omitted. In the meantime, the power-on state can be specified by specifying a control code "Power" to be the message.

The state transition, using the CEC message <User Control Pressed> from the DVD player 30, is achieved by transmitting the CEC message to the logical address (20LA) held in the AV amplifier 20. Thus, the communications apparatus used for the address management method in the embodiment of the present invention can be under the control of the entire network system regardless of a condition that whether or not the one-way data connection is invalid. This is because the communications apparatus can compare the content of the address included in the destination field in the CEC message with the held address of the communications apparatus to respond to the CEC message judged to be addressed to the communications apparatus. In other words, the address management method in the embodiment of the present invention can facilitate continued message transmission with the two-way connection even though the one-way data connection becomes invalid.

Furthermore, the communications apparatus used for the address management method in the embodiment of the present invention can control the entire network system regardless of the condition that whether or not the one-way data connection is invalid. This is because the communications apparatus can transmit the CEC message of the communications apparatus, utilizing an address of another communications apparatus.

Note that the CEC message has been described to be transmitted from the DVD player 30 in the embodiment of the present invention; however, the transmission is not limited to this. The CEC message may be transmitted from either the TV 10 or AV amplifier 20.

Next, description shall be provided, using FIG. 7, in the case where once the one-way data connection has been invalid, and then the connection for one-way data is resumed to be valid.

As shown in FIG. 7, with the AV amplifier 20 connected, the TV 10 changes the HPD into the valid state (turns the HPD signal from low to high) (step 10HPD_T3).

Upon the HPD of the TV 10 changing into the valid state, the AV amplifier 20 reads the EDID of the TV 10 to obtain the physical address "1.0.0.0" (20PA) of the AV amplifier 20 (step 20PA_A_T2). Then, the AV amplifier 20 transmits the <Polling Message> to obtain the logical address of the AV amplifier 20 "Audio System" (20LA) (step 20LA_A_T2). The AV amplifier 20 continues to respond to the CEC message to be transmitted to the logical address of the AV amplifier 20.

Since the logical address (20LA) and the physical address (20PA) of the AV amplifier 20 which are obtained in the step 20PA_A_T2 and step 20LA_A_T2 match the held logical address (20LA) and the physical address (20PA), respectively, the AV amplifier 20 does not transmit the <Report Physical Address> message (step 20A_R_T2). When the AV amplifier 20 changes the HPD into the valid state (turns the HPD signal from low to high) (step 20HPD_T3). A timing at which the AV amplifier 20 validates the HPD is not limited here. For example, the timing may be before the step 20LA_A_T2 (before obtaining the logical address (20LA)).

When the HPD of the AV amplifier 20 changes into the valid state, the DVD player 30 reads the EDID of the AV amplifier 20 to obtain the physical address "1.1.0.0" (30PA) of the DVD player (step 30PA_A_T2). Then, the DVD player 30 transmits the <Polling Message> to obtain the logical address "DVD1" (30LA) of the DVD player 30 (step 30LA_A_T2). The DVD player 30 continues to respond to the CEC message to be transmitted to the logical address of the DVD player 30.

Since the logical address (30LA) and the physical address (30PA) of the DVD player 30 which are obtained in the step 30PA_A_T2 and step 30LA_A_T2 match the held logical address (30LA) and the physical address (30PA), respectively, the DVD player 30 does not transmit the <Report Physical Address> message (step 30A_R_T2).

As described above, the address management method in the embodiment of the present invention simplifies processing in the AV amplifier 20 and the DVD player 30, as well as reduces the number of messages simultaneously transmitted from the apparatuses when a complex two-way message is transmitted, to be able to prevent a collision and conflict of a message by skipping a report notification showing an association of the physical address and logical address in the case where no change is observed for the logical address and physical address.

Next, a communication apparatus 100 to achieve the above functions shall be detailed.

Figure 8:
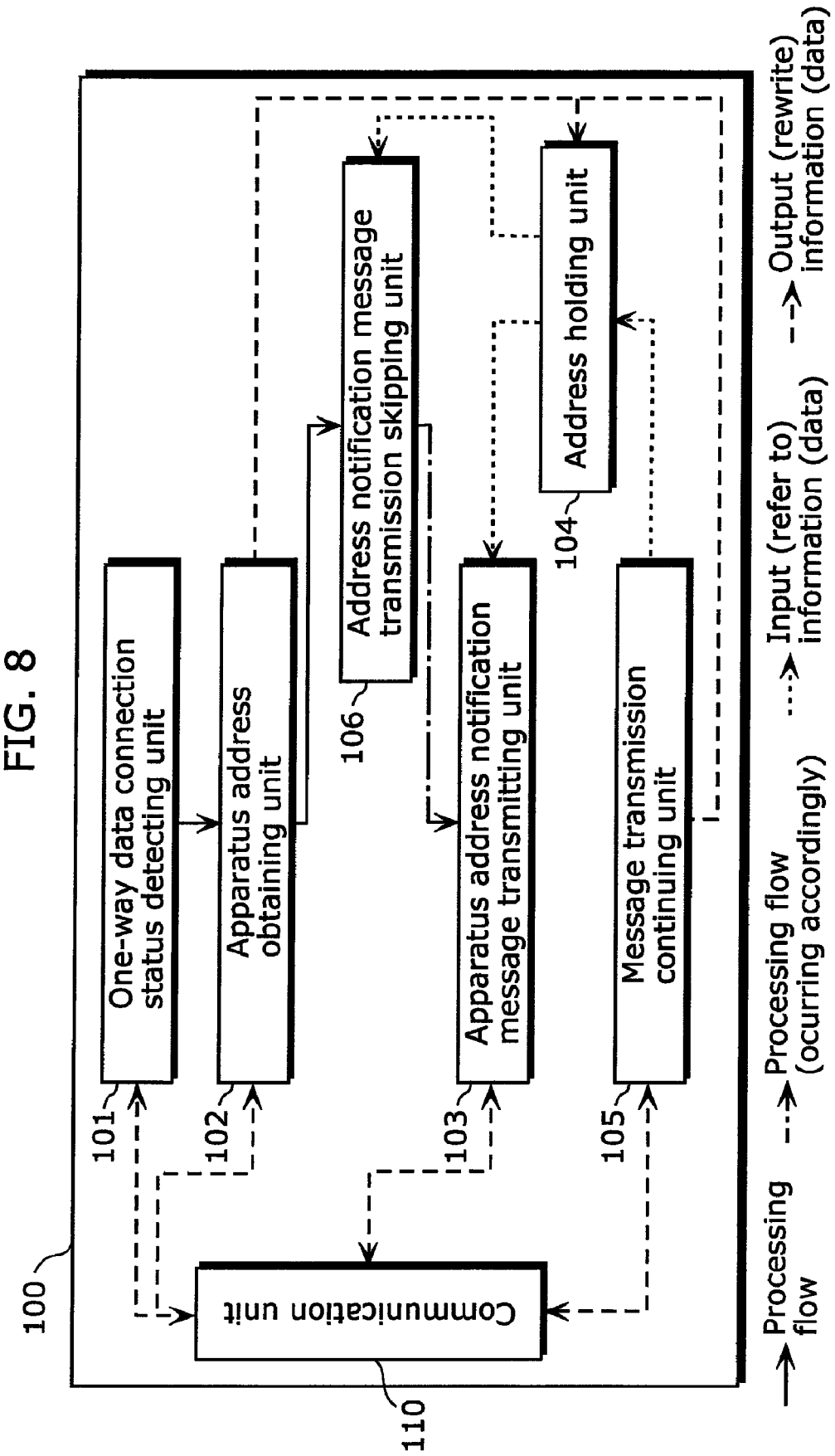
FIG. 8 is a diagram showing a structure of a communications apparatus in the embodiment of the present invention.

FIG. 8 shows a structure of the communications apparatus in the embodiment of the present invention.

The communications apparatus 100 includes: a one-way data connection status detecting unit 101; an apparatus address obtaining unit 102; an apparatus address notification message transmitting unit 103; an address holding unit 104; a message transmission continuing unit 105; an address notification message transmission skipping unit 106; and a communication unit 110. The communications apparatus 100 establishes: a one-way data connection utilized for one-way data connection from a communications apparatus on the data transmission side to another communications apparatus on the data reception side; and a connection to a network in which a message is exchanged in two-way. Note that examples of the communications apparatus 100 are the aforementioned TV 10, AV amplifier 20, and DVD 30.

The communication unit 110 performs one-way data transmission and reception, and two-way communication with another communications apparatus. For example, as the communication unit 110, an interface based on a suitable communication scheme, such as the HDMI, may be provided regardless of whether either wired communication or wireless communication.

The one-way data connection status detecting unit 101 detects a connection validating request and a connection invalidating request outputted from the communications apparatus on the data reception side. The connection validating request is outputted from the communications apparatus on the date reception side in the case where the communications apparatus on the data reception side can receive the data, in other words in the case where the data transmission is possible, utilizing the one-way data connection from the communications apparatus on the data transmission side to the communications apparatus on the data reception side. Further, the connection invalidating request is outputted from the communications apparatus on the data reception side in the case where the communications apparatus on the data reception side cannot receive the data, in other words in the case where the data transmission, utilizing the one-way data connection from the communications apparatus on the data transmission side to the communications apparatus on the data reception side, is impossible. For example, the one-way data connection status detecting unit 101 detects a high HPD signal (connection validating request) and a low HPD signal (connection invalidating request) outputted by the apparatus receiving the TMDS (Transition Minimized Differential Signaling) data for transmitting video, audio, and packet data in the HDMI.

The apparatus address obtaining unit 102 obtains an apparatus address with the message via the network when the one-way data connection status detecting unit 101 detects a change from the connection invalidating request to the connection validating request. For example, the apparatus address obtaining unit 102 obtains the physical address by reading the EDID and the logical address by transmitting the CEC message <Polling Message>.

The apparatus address notification message transmitting unit 103 reports to and notifies of the other communications appliance an association between the physical address and the logical address obtained by the apparatus address obtaining unit 102. The association is notified with the transmission of the CEC messages <Report Physical Address>, for example.

The address holding unit 104 holds the physical address and the logical address obtained by the apparatus address obtaining unit 102. The obtained physical address and the logical address is stored in either RAM or rewritable nonvolatile memory included in the address holding unit 104 to continue to be held regardless of the status whether or not the one-way data connection is invalid (whether or not the one-way data connection status detecting unit 101 detects the connection invalidating request). Note that, via the message transmission continuing unit 105 described below, another physical address and logical address, notified by the other communications apparatus connected to the network, may also be held.

The message transmission continuing unit 105 refers to the address which the address holding unit 104 holds, and then gives a response when receiving the message to the appliance via the network. The message transmission continuing unit 105 continues the two-way transmission to respond to the message, using the logical address and the physical address of the appliance which are held in the address holding unit 104 regardless of the state whether or not the one-way data connection is invalid, the one-way connection which is established for the data transmission and reception from and to the communications apparatus on the data reception side (regardless of whether or not the connection invalidating request is detected by the one-way data connection status detecting unit 101). The message transmission continuing unit 105 may also transmit the CEC message to the other communications apparatus, using the logical address and the physical address of the other communications apparatus which are held in the address holding unit 104 regardless of the state whether or not the one-way data connection is invalid, the one-way data connections which is established for the data transmission and reception from and to the communications apparatus on the data reception side (regardless of whether or not the connection invalidating request is detected by the one-way data connection status detecting unit 101).

The address notification message transmission skipping unit 106 compares whether or not a physical address and a logical address of the appliance which are newly obtained by the apparatus address obtaining unit 102 match the physical address and the logical address of the appliance which have been held by the address holding unit 104, respectively, in the case where the connection for the data transmission and reception from and to the communications apparatus on the data reception side is resumed to be valid after the connection has been invalid once. In the case where the comparison result shows matching, the address notification message transmission skipping unit 106 controls the apparatus address notification message transmitting unit 103 to avoid notifying the address. By skipping the process of the apparatus address notifying message transmitting unit 103, using the address notifying message transmission skipping unit 106, an address assignment scheme can be simplified. Further, the collision and conflict of the message can be avoided, so that an efficient control function can be provided.

As mentioned above, the communications apparatus of the embodiment can easily continue message transmission with a two-way connection by holding a physical address and a logical address for a continued use even though a one-way data connection is invalid or a notification that the one-way-data connection is invalid is received. This provides an effect to always enable an entire network system to be controlled and organized.

Meanwhile, an address notification can be simplified in the case where no change has been observed in the obtained logical address and the physical address. This can avoid a collision and conflict of the message to provide an efficient control function.

The present invention is applicable to address managing methods and communications apparatuses, and particularly to a communications apparatus connected, with a one-way data connection, to a network such as such as a home entertainment network in which messages are transferred in two way between communications apparatuses. The present invention is also applicable to an address management scheme for controlling communications apparatus connected to a network such as a home entertainment network and the like.

The invention claimed is:

1. A communication apparatus which connects to a High-Definition Multimedia Interface (HDMI) cable that is configured to conform to HDMI specifications for establishing a one-way data connection utilized for one-way data transmission to another communication apparatus, and a connection to a network through which messages are transferred in two ways, the communication apparatus comprising:

a one-way data connection status detecting unit operable to detect a connection validating request indicating that data transmission, utilizing the one-way data connection, to the other communication apparatus is possible, and a connection invalidating request indicating that the data transmission, utilizing the one-way data connection, to the other communication apparatus is impossible, the connection validating request and the connection invalidating request being outputted from the other communication apparatus;

an apparatus address obtaining unit operable to obtain an apparatus address with a first message via the network when a change from the connection invalidating request to the connection validating request is detected;

an address holding unit which holds the apparatus address, said address holding unit including a non-transitory computer-readable recording medium for storing the apparatus address; and a message transmission continuing unit operable to cause the communication apparatus to perform an operation or a status check for the apparatus address held in said address holding unit when receiving a second message transmitted to the apparatus address held in said address holding unit via the network regardless of whether or not said one-way data connection status detecting unit detects the connection invalidating request, the second message instructing the communication apparatus to perform the operation or the status check.

2. The communication apparatus according to claim 1, further comprising:

an apparatus address notification message transmitting unit operable to notify another communication apparatus connected to the network of the apparatus address with a third message;

a comparing unit operable to compare the apparatus address obtained by said apparatus address obtaining unit and the apparatus address held by said address holding unit so as to judge whether or not the apparatus address obtained by said apparatus address obtaining unit and the apparatus address held by said address holding unit match each other; and an address notification message transmission skipping unit operable to control said apparatus address notification message transmission unit to avoid notifying the apparatus address in the case where a result of the comparison shows matching.

3. The communication apparatus according to claim 2, wherein said address holding unit further holds the address of the other communication apparatus connected to the network, and said message transmission continuing unit is further operable to, via the network, (i) transmit a fourth message to the address of the other communication apparatus in order to control an operation of the other communication apparatus, the fourth message instructing the other communication apparatus to perform an operation or a status check, and (ii) respond to a fifth message sent from the other communication apparatus, the transmission and the response being executed regardless of whether or not the connection invalidating request is detected.

4. The communication apparatus according to claim 1, wherein said address holding unit further holds the address of the other communication apparatus connected to the network, and said message transmission continuing unit is further operable to, via the network, (i) transmit a fourth message to the address of the other communication apparatus in order to control an operation of the other communication apparatus, the fourth message instructing the other communication apparatus to perform an operation or a status check, and (ii) respond to a fifth message sent from the other communication apparatus, the transmission and the response being executed regardless of whether or not the connection invalidating request is detected.

5. An address management method used in a communication apparatus which connects to a High-Definition Multimedia Interface (HDMI) cable that is configured to conform to HDMI specifications for establishing a one-way data connection utilized for one-way data transmission to another communication apparatus, and a connection to a network through which messages are transmitted among communication apparatuses in two ways, the address management method comprising:

a one-way data connection status detecting step of detecting a connection validating request indicating that data transmission, utilizing the one-way data connection, to the other communication apparatus is possible and a connection invalidating request indicating that the data transmission, utilizing the one-way data connection, to the other communication apparatus is impossible, the connection validating request and the connection invalidating request being outputted from the other communication apparatus;

an apparatus address obtaining step of obtaining an apparatus address with a first message when a change from the connection invalidating request to the connection validating request is detected;

an address holding step of holding the apparatus address, the apparatus address being stored in a non-transitory computer-readable recording medium of an address holding unit; and a message transmission continuing step of causing the communication apparatus to perform an operation or a status check for the apparatus address held in said address holding unit when receiving a second message transmitted to the apparatus address via the network regardless of whether or not the connection invalidating request, for the data transmission from the other apparatus, is detected, the second message instructing the communication apparatus to perform the operation or the status check.

* * * * *